United States Patent
Brun et al.

(10) Patent No.: US 9,519,276 B2
(45) Date of Patent: Dec. 13, 2016

(54) STRUCTURE AND BEHAVIOR OF A BUILDING AUTOMATION SYSTEM

(71) Applicant: SIEMENS SCHWEIZ AG, Zurich (CH)

(72) Inventors: Gerhard Brun, Lucerne (CH); Andreas Fehr, Zurich (CH); Herbert Meier, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 599 days.

(21) Appl. No.: 13/573,669

(22) Filed: Oct. 3, 2012

(65) Prior Publication Data
US 2013/0085610 A1 Apr. 4, 2013

(30) Foreign Application Priority Data
Oct. 3, 2011 (EP) ..................................... 11183684

(51) Int. Cl.
*G06F 17/50* (2006.01)
*G05B 13/00* (2006.01)
(Continued)

(52) U.S. Cl.
CPC ................. *G05B 15/02* (2013.01); *G06F 8/24* (2013.01); *G05B 2219/23255* (2013.01);
(Continued)

(58) Field of Classification Search
CPC ............. G05B 2219/23255; G05B 2219/2642; G06F 8/24; G06F 8/34
See application file for complete search history.

(56) References Cited

U.S. PATENT DOCUMENTS 6,028,998 A * 2/2000 Gloudeman et al. ......... 717/108
7,164,972 B2 1/2007 Imhof et al.
(Continued)

FOREIGN PATENT DOCUMENTS

CN 1898615 A 1/2007
CN 101311864 A 11/2008
(Continued)

OTHER PUBLICATIONS

Mukherjee, Satyen, Dagnachew Birru, Dave Cavalcanti, Eric Shen, Maulin Patel, Yao-Jung Wen, and Sushanta Das. "Closed loop integrated lighting and daylighting control for low energy buildings." Proceedings of the 2010 ACEEE (2010): 252-269.*

*Primary Examiner* — Aniss Chad
(74) *Attorney, Agent, or Firm* — Slayden Grubert Beard PLLC

(57) ABSTRACT

A system for automating a building has an object describing a building section and at least one object describing an automation function and a functional unit having at least one open-loop and/or closed-loop control program, with the object describing a building section having an overview list, in which semantic information units for the building section concerned are able to be stored. A semantic information unit for the building section concerned identifies an automation function which is provided in the building section. The object describing the automation function has an overview list, in which semantic information units for the automation function concerned are able to be stored. The semantic information unit includes a relation to a further object. The relation is implemented such that a bidirectional exchange of data between the corresponding objects is made possible. The system may enable field devices to the replaced or assigned without the need to make modifications in the program code of the open-loop and/or closed-loop control (Continued)

program, since the data exchange is conducted via the describing object.

9 Claims, 2 Drawing Sheets

(51) Int. Cl.
G05B 21/00 (2006.01)
G05D 7/00 (2006.01)
G05B 15/00 (2006.01)
G05B 15/02 (2006.01)
G06F 9/44 (2006.01)
H04L 12/28 (2006.01)

(52) U.S. Cl.
CPC ........... *G05B 2219/2614* (2013.01); *G05B 2219/2642* (2013.01); *H04L 2012/285* (2013.01)

(56) References Cited

U.S. PATENT DOCUMENTS

| 7,734,572 | B2* | 6/2010 | Wiemeyer | G05B 15/02 700/19 |
| 8,516,016 | B2* | 8/2013 | Park et al. | 707/809 |
| 9,188,969 | B2 | 11/2015 | Reed et al. | |
| 2005/0289467 | A1* | 12/2005 | Imhof et al. | 715/734 |
| 2007/0055759 | A1 | 3/2007 | McCoy et al. | |
| 2011/0071685 | A1 | 3/2011 | Huneycutt et al. | |
| 2011/0087650 | A1 | 4/2011 | Mackay et al. | |

FOREIGN PATENT DOCUMENTS

| EP | 11183684 | 10/2011 |
| WO | 01/99078 | 12/2001 |

\* cited by examiner

STRUCTURE AND BEHAVIOR OF A BUILDING AUTOMATION SYSTEM

CROSS REFERENCE TO RELATED APPLICATIONS

This application claims the benefit of EP11183684, filed on Oct. 3, 2011 in the European Patent Office, the disclosure of which is incorporated herein in its entirety by reference.

BACKGROUND

A building automation system is an arrangement for monitoring, open-loop control and/or closed-loop control of process variables in complex technical systems in a building, or in a campus comprising a number of buildings. A building automation system typically operates heating, ventilation and air-conditioning systems, lighting and shading devices and also access control, security and fire surveillance systems. In the building automation system process variables—such as room air conditioning variables or events for example—are detected, evaluated, monitored, influenced or generated, with the energy consumption of the building or campus also advantageously being optimized by the building automation system.

As a rule the building automation system encompasses and operates a plurality of what are known as field devices, such as sensors and actuators. Examples of typical field devices here are temperature and humidity sensors, air quality sensors, pressure sensors, flow meters, electricity meters, heat meters, brightness sensors, fire alarms, intrusion alarms, alarm or sprinkler devices, drives for hot water valves, thermostat valves, ventilation flaps or blinds, light switches, smart card readers or devices for detecting biometric data. The building automation system typically comprises a plurality of software modules, processes or programs, and in general a number of computers or processors for their activation and also as a rule a plurality of open-loop and closed-loop control devices as well as further devices, for example devices for linking the building automation system to external communication networks, screens of devices for analysis of video signals.

In addition at least an electrical or wireless communication medium is used in a building automation system for the exchange of data of individual devices or parts of systems, as a rule a number of communication networks exist, with cables, optical data communication channels, ultrasound connections, electromagnetic near fields or radio networks able to be used, including fiber optic networks or cellular networks for example. Examples of technologies or standards able to be used for the data exchange are BACnet, LON or LonWorks® from the company ECHELON, the European Installation bus EIB, KONNEX, ZigBee or PROFIBUS defined by German standard DIN 19245.

Building automation systems have been available on the market for more than thirty years. After the general spread of object-oriented programming concepts, building automation systems have also been designed, implemented and offered for more than fifteen years with the aid of object-oriented programming concepts.

Building automation systems with an object-oriented software structure are known for example from WO99/39276A and WO99/60487A.

According to the known related art the addressing of data points of field devices is defined directly in a closed-loop or open-loop control program. Thus BACnet input, output and value objects are typically addressed directly in a program. If a number of identical or similar applications are present in a building automation system, for example a number of room temperature closed-loop control programs, the individual programs must be adapted to the field devices. If the building automation system is to be expanded by further field devices, for example because the room division in the building is to be changed, the program code of the closed-loop and/or open-loop control programs involved is to be adapted accordingly for integration of the additional field devices. Since the program code of a closed-loop or open-loop control program typically has an extremely complex structure, these types of program changes demand people with a soundly-based programming knowledge.

SUMMARY

One potential object is to construct a building automation system so that its structure and behavior is suitable for open-loop and closed-loop control programs, for example with an engineering tool, to field device addresses, without a programmer having to make adaptations to the program code of the open-loop and/or closed-loop control program.

The inventors propose a system to automate a building or a campus having a plurality of buildings. The system has a plurality of objects, including an object describing a building section, an object describing an automation function, and a functional unit associated with the object describing the automation function, the functional unit comprising an open-loop and/or closed-loop control program. The object describing the building section has an overview list in which semantic information units for the building section are stored, each identifying an automation function which is provided in the building section. The object describing the automation function has an overview list in which semantic information units are stored for the automation function. Each semantic information unit has an identifier to identify the semantic information unit and has a relation. Each relation defines a type of relation between the object having the semantic information unit stored therein, and another object. Each relation makes possible a bidirectional exchange of data between the object having the semantic information stored therein and the other object. There are at least two different relation types and each relation corresponds to precisely one of the relation types.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
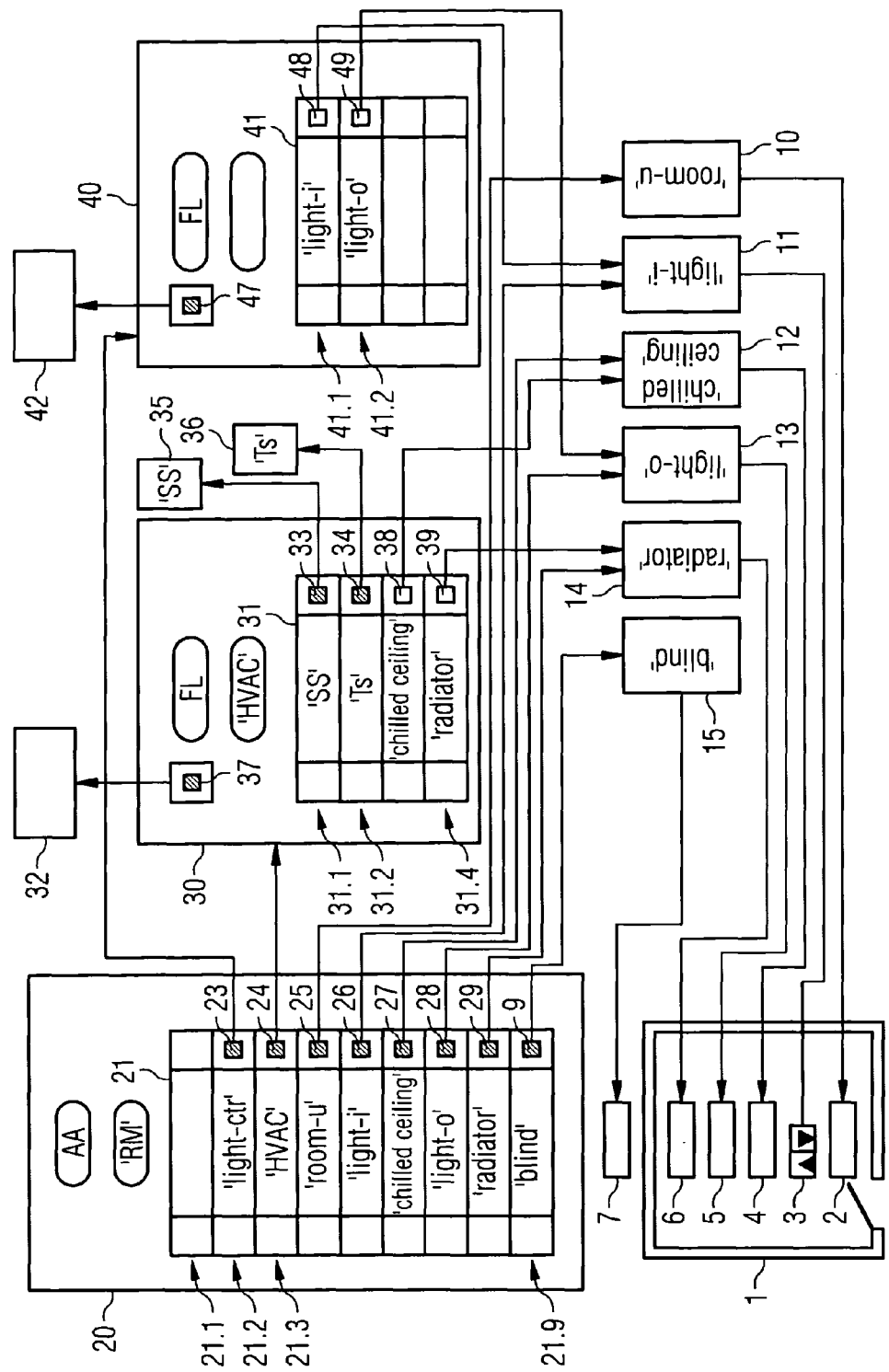
FIG. 1, a principle structure of a building automation system for operating a section of a building, and FIG. 2, a principle diagram for modeling a further building section, having a number of rooms or zones, able to be operated by the building automation system.

Reference will now be made in detail to the preferred embodiments of the present invention, examples of which are illustrated in the accompanying drawings, wherein like reference numerals refer to like elements throughout.

FIG. 1 shows a room 1 of a building section able to be operated by a building automation system. Assigned to the room 1 are a number of field devices, by the use of which for example a desired comfort for users and a required safety for users and infrastructure with optimized operating costs are able to be achieved. Typically assigned to the room 1 are a room unit 2, a light switch 3, an air conditioning register 4, a heating element 5, a heating register 6 and a blind drive 7. The room unit 2 serves as the user interface to the building automation system, for example to enter a nominal room temperature range and to display the current room temperature as well as to display an order of magnitude of the costs of the energy consumed by the room 1.

The devices operated in the room 1 are advantageously modeled in the software of the building automation system as far as is necessary and corresponding models are preferably implemented using an object-oriented approach. Typically the models are connected via input/output modules to field devices. For example the room unit 2 is mapped by a room unit model 10, the light switch 3 by a light switch model 11, the air conditioning register 4 by an air conditioning register model 12, the lighting element 5 by a lighting element model 13, the heating register 6 by a heating register model 14 and the blind drive 7 by a blind drive model 15 in the building automation system.

An overview of the totality of the functionality of the automation functions available for the room 1 is stored in a first overview node 20. The first overview node 20 is an object of the building automation system and features an overview list 21, which has at least one semantic information unit. The semantic information unit identifies an automation function, which is provided in the room 1 represented by the first overview node 20. Advantageously the semantic information unit contains at least one identifier suitable for identification and a relation to the automation function involved. The name is advantageously a string data type with a fixed or variable length.

A specific relationship between two nodes or objects of the building automation system is designated in this text by the term relation. The relation has a predefined type range which comprises at least two different relation types. In the present case what is known as a contacts relation and what is known as an owns relation are defined. The contacts relation is identical here to the relation with the value "contacts" and means here that this relation is implemented such that the relation is suitable for a bidirectional data exchange between the nodes or objects concerned. The owns relation is identical here to the relation with the value "owns" and means here that this relation is implemented such that the relation is suitable on the one hand for a bidirectional data exchange between the nodes or objects concerned, on the other hand nodes or objects with the owns relation are advantageously existentially linked to one another such that they can only be copied, moved and deleted together, by an engineering tool for example.

In the present exemplary embodiment the overview list 21 has space for nine semantic information units 21.1 to 21.9.

A semantic information unit 21.3 able to be identified by the identifier "HVAC"—i.e. heating, ventilation and air conditioning—has an owns relation 24, which applies between the first overview node 20 and a second overview node 30.

A semantic information unit 21.2 able to be identified by the identifier "light-ctr"—i.e. light control—has an owns relation 23, which applies between the first overview node 20 and a third overview node 40.

A semantic information unit 21.4 able to be identified by an identifier "room-u"—i.e. room unit—has an owns relation 25, which applies between the first overview node 20 and the room unit model 10.

A semantic information unit able to be identified by an identifier "light-i"—i.e. light input—has an owns relation 26, which applies between the first overview node 20 and the light switch model 11.

A semantic information unit able to be identified by an identifier "chilled ceiling" has an owns relation 27, which applies between the first overview node 20 and the air conditioning register model 12.

A semantic information unit able to be identified by an identifier "light-o"—i.e. light output—has an owns relation 28, which applies between the first overview node 20 and the illumination element model 13.

A semantic information unit able to be identified by an identifier "radiator" has an owns relation 29 which applies between the first overview node 20 and the air conditioning register model 14.

Finally a semantic information unit able to be identified by an identifier "blind" has an owns relation 9, which applies between the first overview node 20 and the blind drive model 15.

An overview of an automation functionality designated "HVAC"—i.e. heating, ventilation and air conditioning, is stored in the second overview node 30. The second overview node 30 is an object of the building automation system and has an overview list 31 for storage of semantic information units 31.1 to 31.4.

A semantic information unit 31.1 able to be identified by an identifier "SS"—i.e. status—has an owns relation 33, which applies between the second overview node 30 and a first variable 35 advantageously implemented as an object, in which for example current information on the operating state of the automation functionality "HVAC" is able to be stored.

A semantic information unit 31.2 able to be identified by an identifier "Ts"—i.e. temperature setpoint value—has an owns relation 34, which applies between the second overview node 30 and a second variable 36 advantageously implemented as an object, in which for example the temperature setpoint value "Ts" applicable for the automation functionality "HVAC" is able to be stored.

A semantic information unit 31.3 able to be identified by an identifier "chilled ceiling" has a contacts relation 38, which applies between the second overview node 30 and the air conditioning register model 12.

A semantic information unit able to be identified by an identifier "radiator" has a contacts relation 39, which applies between the second overview node 30 and the heating register model 14.

The second overview node 30 has a further owns relation 37, which applies between the second overview node 30 and an open-loop and/or closed-loop control program 32. The automation function required for heating, ventilation and air conditioning of the building section is programmed in the open-loop and/or closed-loop control program 32. The open-loop and/or closed-loop control program 32, the second overview node 30 and the further objects 35 and 36, linked by owns relations to the overview node 30, form a functional unit through the owns relation 37. Through the action option of the available relations an access for reading and writing of data between the open-loop and/or closed-loop control program 32 on the one hand and objects connected via relations with the overview node 30 on the other hand is made possible indirectly via the overview node 30. The described structure of the functional unit makes it possible for field devices to be incorporated into and replaced in the building automation system without program code in the open-loop and/or closed-loop control program 32 concerned having to be adapted for this purpose.

An overview of an automation functionality designated by "light-ctrl"—i.e. light control—is stored in the third overview node 40. The third overview node 40 is an object of the building automation system and has an overview list 41 for storing semantic information units 41.1 to 41.4.

A semantic information unit 41.1 able to be identified by an identifier "light-i"—i.e. light input—has a contacts relation 38, which applies between the third overview node 40 and the light switch model 11.

A semantic information unit 41.2 able to be identified by an identifier "light-o"—i.e. light output—has a contacts relation 39, which applies between the third overview node 40 and the illumination element model 13.

The third overview node 40 has an owns relation 47, which applies between the third overview node 40 and an open-loop and/or closed-loop control program 42. The automation function required for light control in the assigned building section is programmed in the open-loop and/or closed-loop control program 42. The open-loop and/or closed-loop control program 42 and the third overview node 40 form one functional unit through the owns relation 47. The opportunity of the available relations to have an effect makes possible access for reading and writing of data, between the open-loop and/or closed-loop control program 42 on the one hand and objects connected via relations with the third overview node 40 on the other hand, indirectly via the overview node 40. The described structure of the functional unit makes possible the inclusion and replacement of field devices into the building automation system, without program code in the open-loop and/or closed-loop control program 42 concerned having to be adapted for this purpose.

The semantic information units stored in the overview list 21, 31 or 41 are advantageously able to be identified via predefined or standardized designations. This enables operator views, for a control center or management system of the building automation system for example, to be generated in a user-friendly manner and with relatively little effort. By using predefined designations by the string data type for the semantic information units a currently-installed building automation system is able to be documented with relatively little effort.

In an embodiment variant of the overview node 20, 30 or 40, the overview list 21, 31 or 41 is ordered or sorted in accordance with certain rules.

Advantageously device models will be provided with a designation which is able to be evaluated on generation or checking of a relation. If for example, as shown in FIG. 1, the semantic information unit 21.9 of the overview list 21 1 assigned to the room 1 is identified by the character string "blind" and also the corresponding blind drive model 15 is marked with the same identifier, the generation or checking of the owns relation 9 will be simplified and able to be automated.

By using a marking with the data type character string or string in a device model, an automatic linkage of the device model to the associated function unit via the corresponding overview node is made possible without program code having to be modified in the assigned open-loop or closed loop control program.

In accordance with the structure of the building the building sections to be operated by the building automation system are typically divided into rooms with—under some circumstances—very different requirements, or by a grid with grid elements with similar or identical requirements. Overview nodes are advantageously used in advantageous modeling of rooms and grid elements. Grid elements are typically produced by an arrangement of support structures or window structures in the building section. Flexible modeling of the building is achieved by the use of two different types of overview node, a first type for a room and a second type for grid elements. Overview nodes of the type designed for a room are typically labeled "RM", i.e. room, in the drawing, overview nodes of the type designed for grid elements are labelled "GD", i.e. grid or grid element. The overview node 20 shown in FIG. 1 for room 1 is accordingly of type "RM". Overview nodes of type "GD" can be linked dynamically to an overview node of type "RM".

Figure 2:
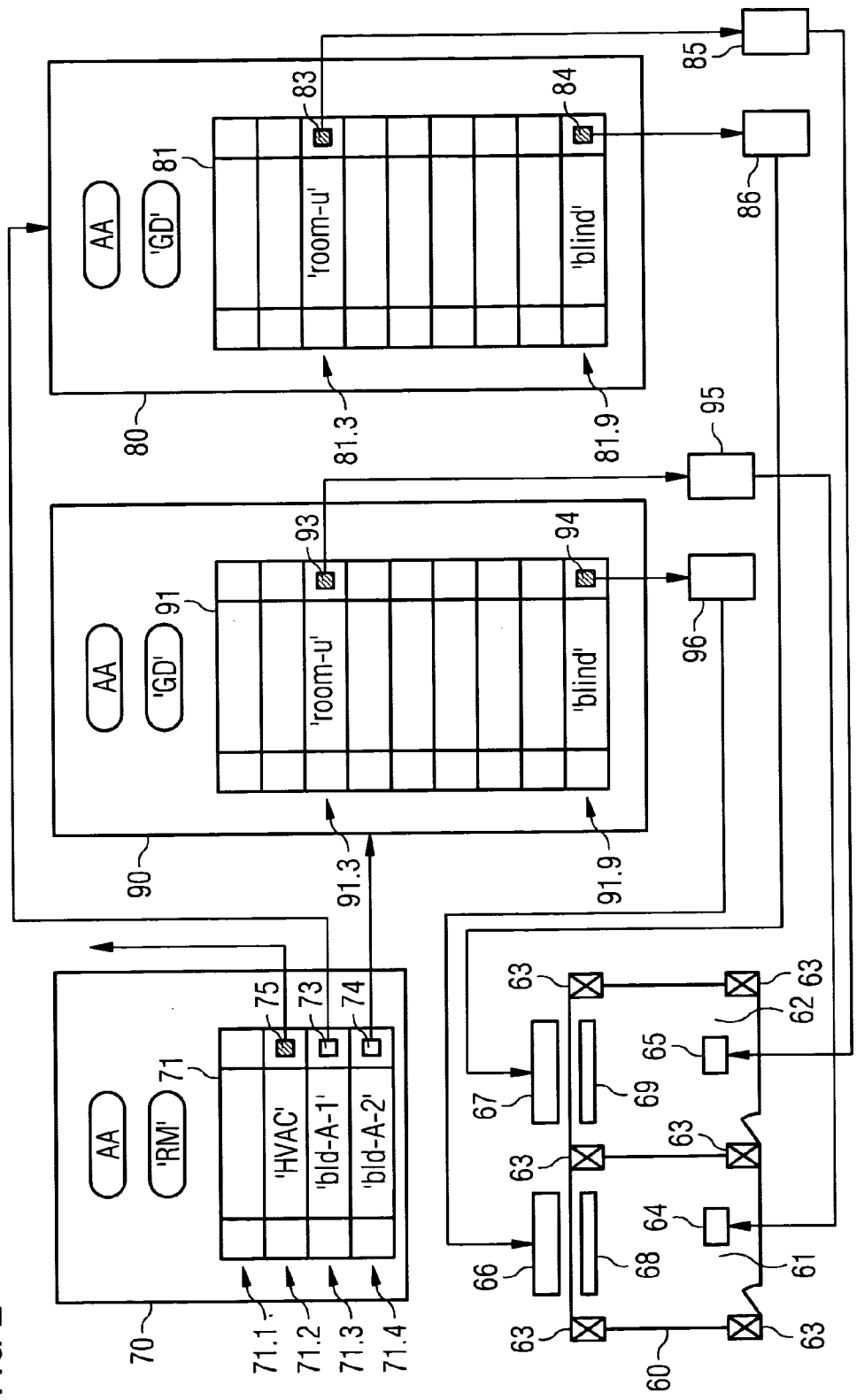

In FIG. 2 a building section divided into the grid is labeled 60, having a first grid element 62 and a second grid element 61. The grid structure of the building section 60 is provided here by support structures 63 for example. The devices assigned to the two grid elements 62 and 61 are reduced here to a minimum for the sake of simplification, since only the principle of the advantageous modeling is to be presented. Grid element 62 or 61 thus comprises a room unit 65 or 64, a heating register 69 or 68, and a blind drive 67 or 66.

The devices operating the grid element 62 or 61 are advantageously modeled in the software of the building automation system as far as necessary and corresponding models are advantageously implemented using an object-oriented approach. The models are typically connected via input/output modules to the field devices. For example the room unit 65 or 64 will be mapped by room unit model 85 or 95 respectively and the blind drive 67 or 66 by a blind drive model 86 or 96 respectively in the building automation system.

A fourth overview node 70 of type "RM", i.e. room, describes the building section 60 which comprises the two grid elements 62 or 61 respectively. The fourth overview node 70 has an overview list 71 for storage of semantic information units 71.1, 71.2, 71.3 and 71.4. A semantic information unit 71.2 able to be identified by the identifier "HVAC"—i.e. heating, ventilation and air conditioning— has an owns relation 75, which is between the fourth overview node 70 and a functional unit is not shown in the diagram, through which for example the heating, ventilation and air conditioning functionality is guaranteed to the entire building section. Furthermore the overview list 71 comprises a semantic unit 71.3 able to be identified with the identifier "bld-A-1" and a semantic unit 71.4 able to be identified with the identifier "bld-A-2".

A current grid division of the building section 60 is stored by semantic information units of the overview list 71. The semantic information unit 71.3 has a contacts relation 73 which applies between the fourth overview node 70 describing the building section 60 and a fifth overview node 80. The semantic information unit 71.4 has a contacts relation 74 which applies between the fourth overview node 70 and a sixth overview node 90.

The fifth overview node 80 and the six overview node 90 of type "GD", i.e. grid or grid element. In accordance with the first overview node 20 in FIG. 1, which describes the totality of the automation functions specifically available for the room 1, the totality of the automation functions specifically available for the first grid element 62 is listed in the fifth overview node 80, and the totality of the automation functions specifically available for the second grid element 61 in the sixth overview node 90. Semantic information relating to the first grid element 62 is stored in the overview list 81 in the fifth overview node 89. Correspondingly semantic information relating to the second grid element 61 is stored in the overview list 91 in the sixth overview node 90.

The structure and the method of operation which are made possible by the proposed overview nodes, overview lists, relations and functional units in particular produce the following advantages in the engineering, commissioning and maintenance phases: Nodes are able to be copied during engineering, relations are able to be checked with the aid of suitable identifiers by an engineering tool or at runtime automatically, field devices, grids and scope of the available functionality of building sections are able to be changed without modifications having to be made to the program code of open-loop and/or closed-loop control programs since the closed-loop and or open-loop control programs access field devices directly via overview nodes.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A system for addressing field devices running on a processor to automate a building or a campus having a plurality of buildings, the system comprising:
   a plurality of objects, comprising:
   an object describing a building section, a field device associated with the building section;
   an object describing an automation function;
   a functional unit associated with the object describing the automation function, the functional unit comprising an open-loop and/or closed-loop control program; and
   an input/output module running on the processor and connecting the system to the field device,
   wherein the object describing the building section has a building section overview list in which semantic information units for the building section are stored, each identifying an automation function which is provided in the building section,
   wherein the object describing the automation function has an automation function overview list in which semantic information units are stored for the automation function,
   wherein each semantic information unit has an identifier to identify the semantic information unit and has a relation,
   wherein each relation defines a type of relation between the object having the semantic information unit stored therein, and another object,
   wherein each relation makes possible a bidirectional exchange of data between the object having the semantic information stored therein and the other object,
   wherein there are at least two different relation types and each relation corresponds to precisely one of the relation types,
   wherein the system is configured to allow installation or replacement of the field device without changing the open-loop or the closed-loop control program, and
   wherein the system is configured to control the field device using the functional unit in accordance with the automation function.

2. The system as claimed in claim 1,
   wherein there are first and second relation types,
   wherein the second relation type requires that related objects must be copied, moved or deleted together, and
   wherein the object having the semantic information unit stored therein is related to the other object according to the second relation type.

3. The system as claimed in claim 2,
   wherein the first relation type is a contacts relation, and
   wherein the second relation type is an owns relation.

4. The system as claimed in claim 3, wherein the object describing the automation function is related according to the second relation type, to the functional unit comprising the open-loop and/or closed-loop control program.

5. The system as claimed in claim 4, wherein
   the building has at least first and second building sections,
   a first building object describes the first building section,
   a second building object describes the second building section, and
   the building section overview list of the first building object describing the first building section has a semantic information unit with a relation to the second building object describing the second building section.

6. The system as claimed in claim 5, wherein for each semantic information unit, the identifier has a character string data type.

7. The system as claimed in claim 1, wherein the object describing the automation function is related according to the second relation type, to the functional unit comprising the open-loop and/or closed-loop control program.

8. The system as claimed in claim 1, wherein
   the building has at least first and second building sections,
   a first building object describes the first building section,
   a second building object describes the second building section, and
   the building section overview list of the first building object describing the first building section has a semantic information unit with a relation to the second building object describing the second building section.

9. The system as claimed in claim 1, wherein for each semantic information unit, the identifier has a character string data type.

* * * * *